United States Patent

[11] 3,571,882

| [72] | Inventor | John R. Andrew |
| | | Columbus, Ohio |
| [21] | Appl. No. | 814,079 |
| [22] | Filed | Apr. 7, 1969 |
| [45] | Patented | Mar. 23, 1971 |
| [73] | Assignee | The Columbus Auto Parts Company |
| | | Columbus, Ohio |

[54] METHOD OF ASSEMBLING PIVOT JOINTS
7 Claims, 6 Drawing Figs.

[52] U.S. Cl. ................................................. 29/149.5
[51] Int. Cl. ................................................. B23p 11/00
[50] Field of Search .......................................... 29/149.5;
219/107; 287/87, 90

[56] References Cited
UNITED STATES PATENTS

| 1,606,894 | 11/1926 | Phelps .................... | 219/107 |
| 1,665,468 | 4/1928 | Murray, Jr. ............... | 219/107X |
| 2,871,315 | 1/1959 | Dales ..................... | 219/107X |
| 3,197,842 | 8/1965 | Parker .................... | 29/149.5 |
| 3,464,723 | 9/1969 | Herbenar ................. | 287/87 |

Primary Examiner—Thomas H. Eager
Attorney—Schmieding and Fultz

ABSTRACT: A method of fabricating flexible joints such as are used in automotive-steering linkages or the like wherein upper and lower electrically conductive housing portions are fused together at a junction such that the space between the inner housing surfaces is substantially equal to the stacked dimensions of the internal elements of the joints. The resulting swivel joints are characterized by precisely controlled swivel torque values and extended fatigue life during operational use.

INVENTOR.
JOHN R. ANDREW

METHOD OF ASSEMBLING PIVOT JOINTS

This invention relates generally to flexible joints and more particularly to a new and improved method of assembling ball and socket joints such as are used in automobile-steering linkages or the like.

In general, the present invention consists of a novel method for precisely assembling the components of ball joints at high rates of production such that the axial end clearance between the housing and stacked internal parts, such as pivotal head members and bearing seats for same can be precisely controlled to predetermined dimensional limits with resulting advantages in the control of swivel torque and extended fatigue life.

More particularly, the method of the present invention comprises, for example, assembling a pivotal ball or head member between two seats in a cavity-forming housing portion that is closed with a closure-forming housing portion or cap. A spring for the takeup of wear is mounted within the housing portion between one of the seats and the cap. The two housing portions are then joined in a novel controlled manner so as to precisely control the above-mentioned axial clearance.

It has been determined by laboratory tests and field service studies of prior ball joints of this type that when such axial end clearance is present, then axial motion of the internal components, with respect to the housing, will occur under rough road conditions causing internal hammering of the joint components with a resulting decrease in the fatigue life of the joint.

On the other hand, if the cap or upper housing portion is too tightly assembled against the internal components then excessive swivel torque values, or actual binding of the internal components will occur.

It has further been determined that when substantially zero axial end clearance is achieved, by the joint closure method of the present invention, which also permits the high rates of production required by the automobile industry, the maximum in fatigue life is achieved at commercially acceptable production costs.

In accordance with the method of the present invention the two housing portions are secured together by first supporting a cavity-forming housing portion, with the internal joint components assembled therein, in a recess of a lower electrode of a resistance welding apparatus with the recess surface conforming in shape with and in electrically conductive contact with the exterior surface of such housing portion. The cap, or closure forming housing portion is next supported on an upper electrode of said resistance welding apparatus so as to be in electrically conductive contact therewith.

The upper electrode that positions the cap is next actuated to cause the cap to engage the cavity-forming housing portion at an annular junction and the electrodes are then energized to heat said junction. At the same time the electrodes are used to apply pressure to the engaged housing portions and thereby cause the metal to upset at said annular junction, and the application of pressure is continued up to some predetermined electrode pressure value, to cause the cap to move down through an annular zone of local plasticity at said junction until the internal distance between opposite inner surfaces of the housing portions is substantially equal to the stacked dimensions of the internal parts of the ball joint. It has been determined that such predetermined electrode pressure can be accurately established and automatically controlled by the setting of controls for the resistance-welding apparatus so as to achieve the above-mentioned substantially zero axial end clearance between the internal parts of the joint.

As another aspect of the present invention, the present method results in a housing construction formed of integrally fused housing portions joined at an annular zone of superior strength. This results in superior "cap pushout resistance" as compared to prior methods employed in the production closing of ball joints.

As another aspect of the present invention the novel method of establishing a predetermined preloading of the deformable seat during the actual joining of the housing portions results in substantial savings in labor and tooling as compared to conventional joint closure methods. It should be mentioned that prior to the present invention it has been the practice to attach closure forming housing portions by spinning, curling, or staking the upper edge of the cavity-forming housing portion so as to overly the peripheral edge of said closure-forming housing portion. Such prior methods required precise preassembly machining of the upper cap-receiving edge of the cavity-forming housing portion to establish precise concentricity. Such conventional operations have been very complex and expensive with respect to tool cost and maintenance.

In contrast, with the method of the present invention the previously discussed predetermined frictional force can be accurately established during the closing of the joint by applying a predetermined electrode pressure.

It is therefore an object of the present invention to provide a new and improved method of assembling ball joints which permits precise control of the axial end clearance between the internal components and housing portions of the joints whereby substantially zero clearance can be achieved at high rates of production.

It is another object of the present invention to provide a high production method of assembling ball joints wherein the clearance between the internal components and the housing can be precisely established by the application of resistance heating together with the application of a predetermined electrode pressure value.

It is another object of the present invention to provide a method of the type described that results in improved ball joints wherein hammering of the internal components during operational use is prevented, with a resulting increase in fatigue life.

It is another object of the present invention to provide a method of the type described that produces ball joints wherein excessive swivel torque values have been eliminated.

It is another object of the present invention to provide a method of the type described that produces ball joints wherein a closure-forming housing portion is integrally fused to a cavity-forming housing portion at an annular junction of superior strength. As a result the resistance to internal "pushout" forces, imposed by the internal pivotal head on the housing, is substantially increased.

It is another object of the present invention to provide a method of the type described that produces ball joints with reduced machining costs as compared to prior production methods.

Further objects and advantages of the present invention will be apparent from the following description, reference being had to the accompanying drawings wherein a preferred form of embodiment of the invention is clearly shown.

IN THE DRAWINGS

Figure 1:
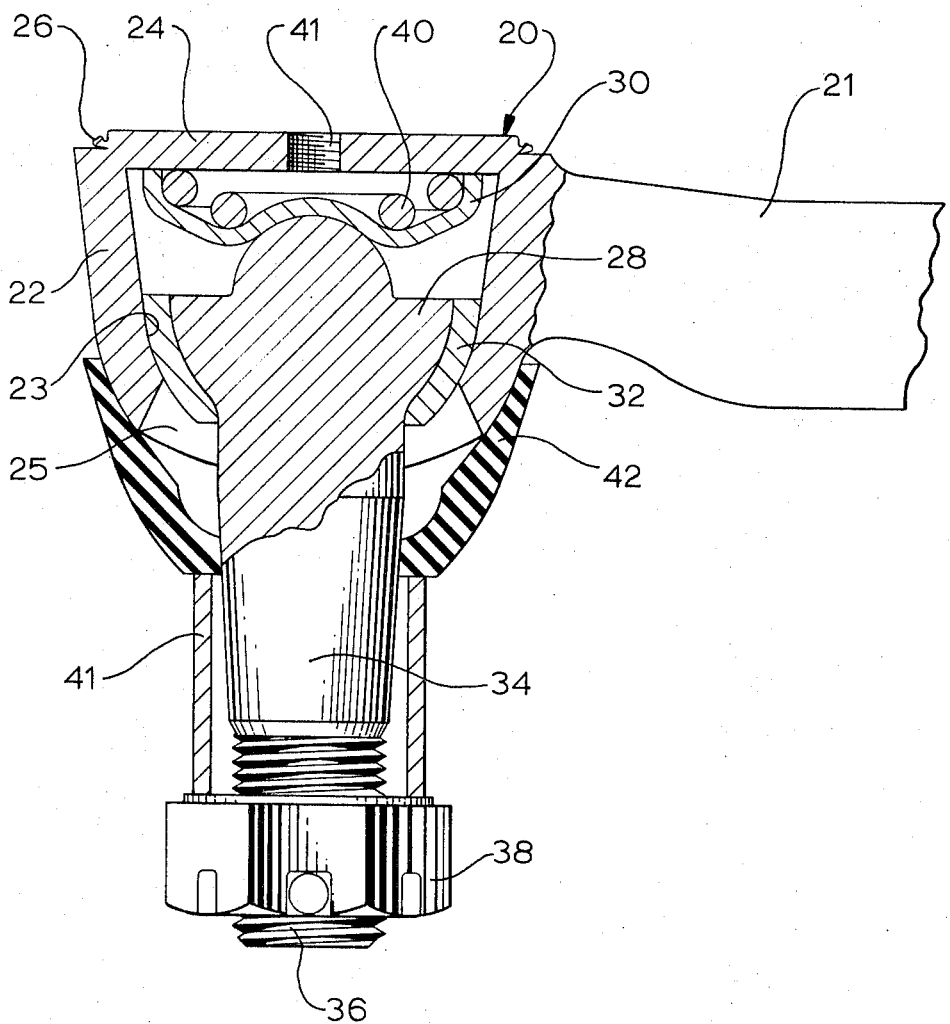
FIG. 1 is a partial side sectional view of a ball joint constructed in accordance with the method of the present invention, the section being taken along a vertical plane through the centerline of the device.

Referring in detail to the drawings, a pivot joint constructed in accordance with the method of the present invention is illustrated in FIG. 1 and comprises housing means indicated generally at 20 formed from a lower or cavity-forming housing portion 22 and an upper or closure-forming housing portion 24 which are integrally fused at a junction 26.

The pivot joint of FIG. 1 further includes a pivotal head 28, an upper seat 30, and a lower seat 32, said internal components being formed of steel or other suitable material.

Head 28 includes a shank portion 34 provided with a threaded lower end 36 and a nut 38 for attaching the pivotal head 28 to adjacent structure in operational use.

With continued reference to FIG. 1, a pre-loaded spring 40 of the compression type is interposed between upper seat 30 and upper housing portion 24. Such spring functions to takeup normal wear during operational use.

Referring again to FIG. 1 the lower portion of the flexible joint between the lower seat 32 and pivotal head 28 is sealed by a dust cover 42 formed of an elastomer such as Neoprene or the like. A cylindrical ferrule 44 is mounted between dust cover 42 and nut 38.

Figure 2:
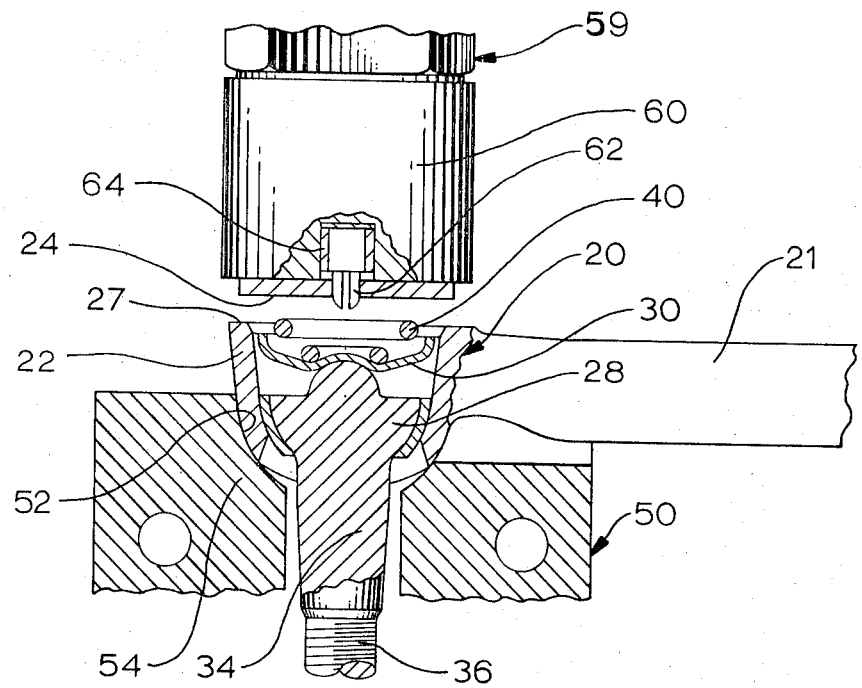
FIG. 2 is a partial side sectional view showing the housing portions of the ball joint of FIG. 1 positioned on upper and lower positioning electrodes arranged in accordance with the method of the present invention, the section being taken along a vertical plane through the centerline of the device.
Figure 3:
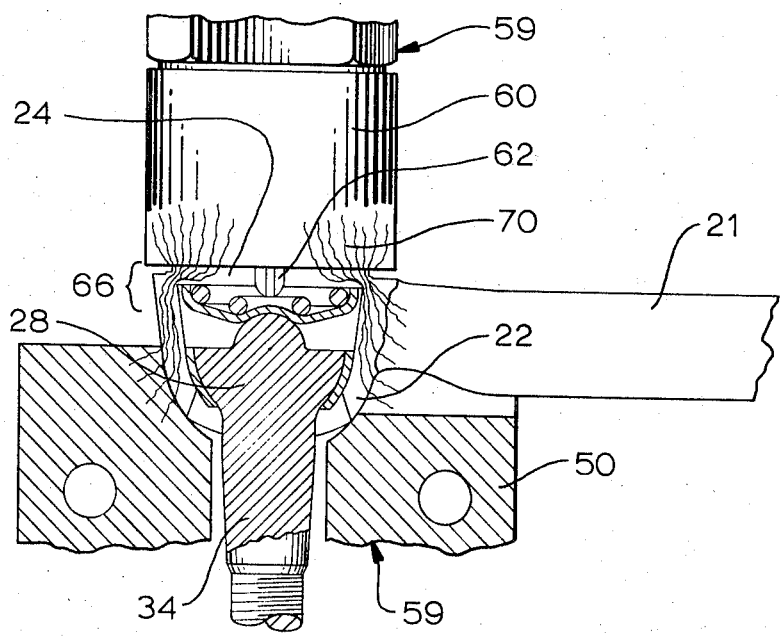
FIG. 3 is a partial side sectional view corresponding to FIG. 2 and showing the electrodes in an energized position.

Reference is next made to FIGS. 2 and 3 which illustrate the application of the method of the present invention in the assembly of the pivot joint of FIG. 1 wherein it will be seen that the components of such joint are assembled in a unique manner by application of resistance heating and pressure to upset and fuse the housing portions in a controlled manner.

Figures 4, 5, 6:
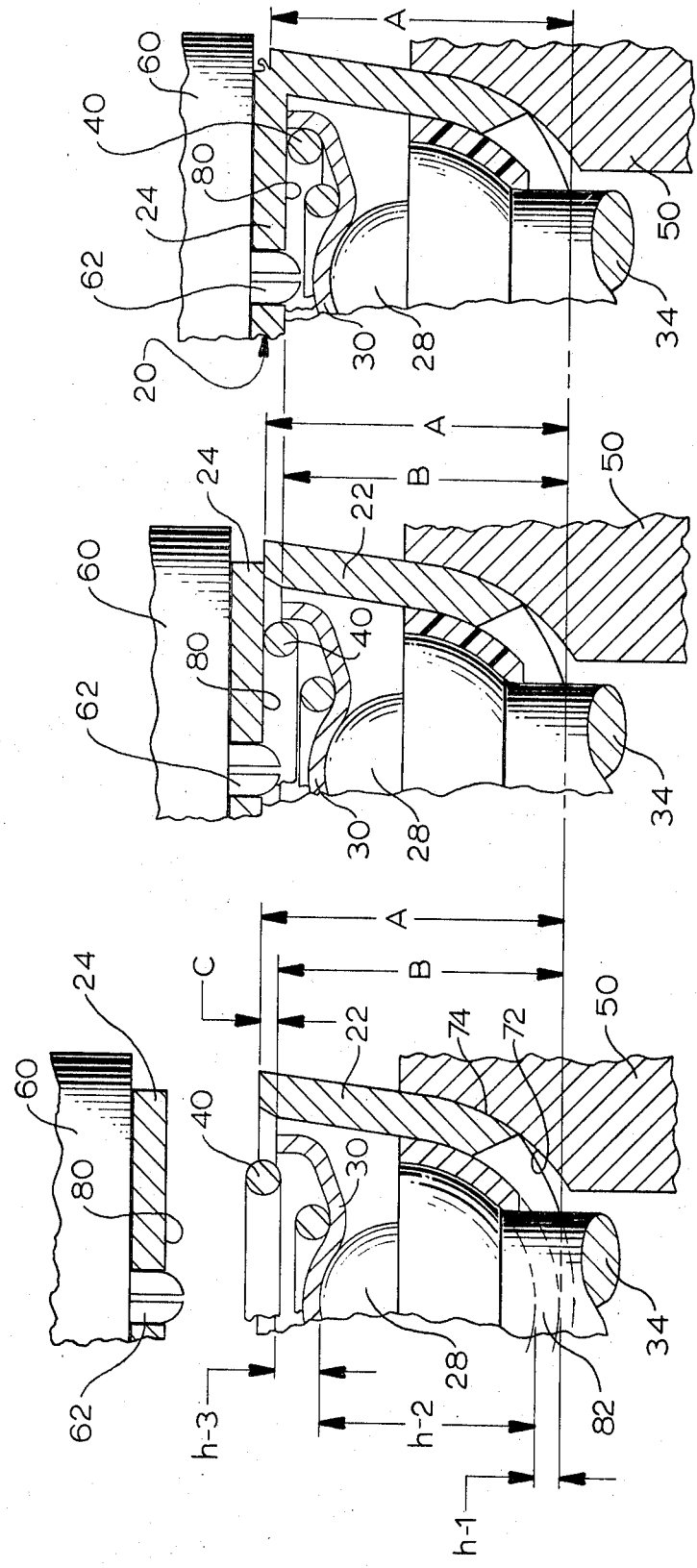
FIGS. 4 through 6 are partial side sectional views illustrating steps in the method of the present invention, the sections being taken along a vertical plane through the centerline of positioning electrodes with ball joint components supported thereon.

In preparing the recess-forming housing portions 22 for assembly in accordance with the present invention the sequence of operations are as follows:

1. Forge to shape;
2. Coin to finish inner surface 23;
3. Pierce bottom opening 25;
4. Face off top surface 27 to establish a predetermined dimension A greater than the desired finished dimension B as shown in FIG. 4;
5. Mill bottom opening 25 to establish proper angularity for required range of motion of shank 34;
6. Assemble internal components in recess-forming housing portion 22;
7. Apply heat and pressure in a controlled manner to upset and fuse housing portions.

In preparing lower housing portions such as 22 for conventional assembly the sequence of operations are as follows:

1. Forge to shape:
2. Coin to finish inner surface 23;
3. Pierce bottom opening 25;
4. Turn, counterbore and face to prepare a recess, not illustrated, for receiving a closure-forming housing portion;
5. Mill bottom opening 25 to establish proper angularity for required range of motion of shank 34;
6. Assemble internal components in recess-forming housing portion 22;
7. Attach upper housing portion by spinning, curling, or staking the upper edge of the lower housing portion so as to overly the peripheral edge of the upper housing portion and thereby retain same.

It will now be seen that the differences in the two methods occur in steps 4 and 7. It should be pointed out that step 4 of the conventional method is quite expensive with respect to both labor and tooling since accurate concentricity must be maintained between the turn and counterbore operations, as well as with the body of the socket. It should be emphasized that the tools to perform these conventional operations are very complex and expensive.

In contrast, with the method of the present invention it is merely necessary to face off the top surface 27 of the lower housing portion to establish a predetermined dimension A above a reference datum D so far as the preparation step 4 is concerned.

FIG. 2 illustrates a portion of an apparatus 59 for practicing the present method which includes a lower electrode 50 for positioning lower housing portion 22 with an inner surface 52 of said electrode conforming in shape with an outer surface 54 of said lower housing portion.

The apparatus 59 for closing flexible joint 20 further includes a movable upper electrode 60 which serves to position the previously mentioned closure-forming housing portion 24, as well as means for applying pressure to the housing portions.

As seen in FIG. 2 upper electrode 60 includes a split pin 62 which is insulated from electrode 60 by a layer of insulation 64.

The above-mentioned lower electrode 50 and upper electrode 60 are energized and pressurized by an electric resistance projection welding machine, of a press type, which may be air operated and provided with automatic voltage control. With a machine of this type and with the electrodes constructed in accordance with the present application, the heating, application of pressure, and upsetting of metal are concentrated in a precisely controlled manner in a localized zone in the housing portions at their junction.

Reference is next made to FIG. 3 which illustrates the same upper electrode 60, and lower electrode 50 in a pressure applying configuration wherein the upper housing portion or cap 24 has been brought into engagement with a peripheral upper edge of lower housing portion 22.

In this configuration of FIG. 3 the upper and lower electrodes 60 and 50 have been energized to upset metal and defuse the junction of a peripheral edge of cap 24 and an upper edge of lower housing portion 22.

It is important to note that electrical energy is concentrated at an annular zone at said junction as is indicated by the diagrammatic lines representing current flow as seen at 70 in FIG. 3.

Reference is next made to FIGS. 4, 5, and 6 which diagrammatically illustrate, in more precise detail, the method of fabricating flexible joints in accordance with the present invention.

FIG. 4 illustrates the previously mentioned lower positioning electrode 50 and an upper positioning electrode 60, with said electrodes serving to respectively position lower cavity-forming housing portion 22 and upper closure-forming housing portion 24. Here it should be mentioned that lower cavity positioning electrode 50 includes inner surface 52 which substantially conforms in shape with outer surface 54 of said lower housing portion. Such surface conformation makes the metal of the lower housing portion 22 and the electrode 50 in such intimate, conductive contact that the electrical energy transmitted to junction 66 can be most efficiently applied to the upsetting and fusing of such junction.

FIG. 5 illustrates another step in the present invention wherein the upper electrode 60 has been moved downwardly so as to bring upper housing portion 20 into engagement with lower housing portion 22. At this point the previously mentioned upsetting and fusing apparatus 59 is energized to thereby concentrate its heating effect at the annular junction 66 between the two housing portions. At the same time pressure is applied to the joint by the apparatus such that upper electrode 60 moves upper housing portion 24 downwardly for a dimension equal to a predetermined dimension C whereby lower surface 80 on the upper housing portion is moved downwardly to a terminal dimension B as will be best seen in FIGS. 5 and 6.

It is important to note that after such downward movement of the lower surface 80 of upper housing portion 20 the ultimate dimension B between a lower arcuate projection 82 of the inner surface of lower housing portion 22, seen in FIG. 4, and the previously described lower surface 80 of closure 20, is equal substantially to the stacked dimensions of the internal parts of the flexible joint which stacked dimensions equals the sum of dimensions $h\text{-}1 + h\text{-}2 + h\text{-}3$ seen in FIG. 4 of the drawings.

It should be pointed out that the ultimate dimension B between the internal surfaces of the housing portions can actually be slightly less than the stacked dimension of the internal parts indicated by the sum of $h\text{-}1 + h\text{-}2 + h\text{-}3$ such that a so called "negative tolerance" is present. This results from the resilience of upper seat 30 which can be compressed slightly during assembly without exceeding the acceptable swivel torque range for the pivot joint.

At the time that electrode 60 arrives at its terminal position of FIG. 6, wherein the lower surface 80 of the closure-forming housing portion 24 is located at predetermined dimension B from the inner surface of lower housing portion 20, the electrical energy previously discussed is terminated whereby the upset junction 66, FIG. 3, will solidify thereby locking closure-forming housing portion 24 in the position shown in FIGS. 1 and 6. In this position the stacked dimension of the internal parts which are represented by the sum of $h\text{-}1+h\text{-}2+h\text{-}3$, in FIG. 4, will be substantially equal to the dimension B which has been established by the application of electrical energy an the predetermined electrode pressure, to the annular zone at junction 66 in FIG. 3.

It should be mentioned that it is necessary that application of such predetermined resistance heating and pressure always establish a dimension B which is exactly equal to the sum of the dimensions of the stacked parts; i.e. the sum of the dimensions $h\text{-}1+h\text{-}2+h\text{-}3$, since it is only necessary that a dimension substantially equal to dimension B be established so as to be acceptable within production tolerance limits. It will now be understood that by the controlled application of heat and pressure and by using an apparatus 59 which is pressure controlled automatically, it is possible to sequentially assemble pivot joints at high production rates such that the internal stacked dimension of the components will be substantially equal to the internal spacing between the inner surfaces of respective upper and lower housing portions.

I claim:

1. The steps in the method of assembling flexible joints of the type that include first and second housing portions engaging one another at a junction, spaced inner housing surfaces, and internal elements including a pivotal head between said surfaces, said method comprising applying electrical energy to electrically conductive housing portions at said junction at a localized zone and a predetermined pressure to upset said junction and thereby fuse said housing portions with the space between said inner housing surfaces being substantially equal to the stacked dimensions of said internal elements.

2. The method defined in claim 1 wherein a compression spring means is interposed between one of said seats and its respective housing surface.

3. The steps in the method of assembling flexible joints of the type that include first and second housing portions engaging one another at a junction, a first seat-engaging surface on one of said housing portions, a second seat-engaging surface on the other of said housing portions, a first seat for engagement with said first surface, a second seat for engagement with said second surface, a head pivotally mounted between said seats, said method comprising applying electrical energy to electrically conductive housing portions at said junction at a localized zone and applying a predetermined pressure to said housing portions to upset said junction and thereby fuse said housing portions with the space between said seat-engaging surfaces being established at a dimension substantially equal to the stacked dimensions of said seats and head.

4. The method defined in claim 3 wherein a compression spring means is interposed between one of said seats and its respective seat-engaging surface.

5. The steps in the method of assembling flexible joints of the type that include a cavity-forming housing portion provided with a first inner surface and an opening defined by an annular edge, a closure-forming housing portion including a second inner surface and a peripheral edge, first and second seats within said housing portions, a head pivotally mounted between said seats, and a spring operatively interposed between one of said inner surfaces and one of said seats for biasing said seats and head together, said method comprising:

a. placing an electrically conductive cavity-forming housing portion in a recess of a cavity positioning electrode, the shape of said recess substantially conforming with a portion of the exterior of said cavity-forming housing portion, said seats, heads and spring being assembled in non-compressed relationship in said cavity-forming housing portion;

b. positioning an electrically conductive closure-forming housing portion adjacent said opening with said edges aligned with one another;

c. applying pressure to a closure-positioning electrode engaging the outer side of said closure-forming housing portion to move said electrodes towards one another, said electrodes being energized whereby current is concentrated in an annular zone at said edges of the housing portions thereby providing an annular zone of local plasticity whereby said pressure and energy cause the flow of metal in said zone permitting relative movement of said housing portions towards one another; and d. deenergizing said electrodes at a predetermined pressure value whereby said housing portions are integrally fused at said zone with the internal space between said inner surfaces being substantially equal to the stacked dimensions of said seats and head.

6. The steps in the method of assembling flexible joints of the type that comprises first and second housing portions engaging one another at a junction, a first seat-engaging surface on said first housing portion, a second seat-engaging surface on said second housing portion, a first seat for engagement with said first surface, a second seat for engagement with said second surface, a head pivotally mounted between said seats, the stacked dimension D of said seats and head being equal to the sum of preselected dimensions $h\text{-}1+h\text{-}2+h\text{-}3$, said method comprising:

a. positioning the above-mentioned components including electrically conductive housing portions between spaced electrodes with each electrode conforming with and engaging the exterior of a respective one of said housing portions;

b. Moving certain of said electrodes to cause engagement of said housing portions at said junction with the space between said seat-engaging surfaces being substantially equal to a selected dimension A; and c. energizing said electrodes while applying pressure to said housing portions to upset metal at said junction and thereby decrease said dimension A by an amount substantially equal to a dimension C whereby the space between said surfaces is established at a dimension substantially equal to B.

7. The steps in the method of assembling flexible joints which method comprises:

a. forming first housing portions each of which includes a vertical dimension between a first internal seat-engaging surface and an outer edge surface which is substantially equal to a selected dimension A;

b. forming second housing portions each of which includes a second internal seat-engaging surface and a peripheral edge surface;

c. forming first internal seats each of which includes a vertical dimension substantially equal to a selected dimension $h\text{-}1$;

d. forming internal heads each of which includes a vertical dimension substantially equal to a selected dimension $h\text{-}2$;

e. forming second internal seats each of which includes a vertical dimension substantially equal to a selected dimension $h\text{-}3$;

f. positioning a first housing portion in the cavity of a first positioning electrode, the shape of said cavity conforming with a portion of the exterior shape of said first housing portion;

g. positioning a first seat, a head, and a second seat in stacked relation in said first housing portion, the stacked dimension of said internal parts being substantially equal to $h\text{-}1+h\text{-}2+H\text{-}3$;

h. positioning a second housing portion in engaged relationship with a second positioning electrode with said peripheral edge surface confronting said outer edge surface with the dimension between said internal seat-engaging surfaces being substantially equal to said selected dimension A;

i. energizing said electrodes and moving one of said electrodes towards the other of said electrodes to apply heat and pressure to an annular zone at the junction of said edges and thereby upset certain of said edges; and j. continuing the application of said pressure and movement of said electrode to a predetermined pressure value to decrease dimension A by a selected dimension substantially equal to a dimension C and thereby fuse said edges with the vertical dimension between said first and second internal seat-engaging surfaces being substantially equal to a selected dimension B, where B is substantially equal to the sum of $h\text{-}1 + h\text{-}2 + h\text{-}3$ and where the clearance between said internal parts and said seat engaging surfaces is substantially equal to zero.